(12) United States Patent
Himmelmann

(10) Patent No.: US 10,422,302 B2
(45) Date of Patent: Sep. 24, 2019

(54) LOAD RELIEVING MECHANISM FOR ELECTRO-MECHANICAL ACTUATOR

(71) Applicant: Hamilton Sundstrand Corporation, Charlotte, NC (US)

(72) Inventor: Richard A. Himmelmann, Beloit, WI (US)

(73) Assignee: HAMILTON SUNDSTRAND CORPORATION, Charlotte, NC (US)

( * ) Notice: Subject to any disclaimer, the term of this patent is extended or adjusted under 35 U.S.C. 154(b) by 386 days.

(21) Appl. No.: 15/012,940

(22) Filed: Feb. 2, 2016

(65) Prior Publication Data

US 2017/0218883 A1    Aug. 3, 2017

(51) Int. Cl.
| | |
|---|---|
| F02K 9/80 | (2006.01) |
| F16H 25/20 | (2006.01) |
| H02K 7/06 | (2006.01) |
| F16H 25/22 | (2006.01) |

(52) U.S. Cl.
CPC ......... F02K 9/805 (2013.01); F16H 25/2021 (2013.01); H02K 7/06 (2013.01); F05D 2220/80 (2013.01); F05D 2230/60 (2013.01); F05D 2260/57 (2013.01); F05D 2270/64 (2013.01); F16H 25/2204 (2013.01); F16H 2025/2081 (2013.01)

(58) Field of Classification Search
CPC . F02K 9/84; F02K 9/805; F16H 25/20; F16H 25/2021; F16H 25/2204; F16H 2025/2081; H02K 7/06; F05D 2220/80; F05D 2230/60; F05D 2260/57; F05D 2270/64; F16F 9/00; F16F 9/535; B63H 20/10
USPC ........................................................ 60/204
See application file for complete search history.

(56) References Cited

U.S. PATENT DOCUMENTS

| 5,607,123 A * | 3/1997 | Larsen .................... F02K 9/805 244/171.2 |
| 2014/0238794 A1* | 8/2014 | Abensur ................. F16F 9/003 188/268 |

FOREIGN PATENT DOCUMENTS

| DE | 19519948 A1 | 12/1996 |
| FR | 2981707 A1 | 4/2013 |

OTHER PUBLICATIONS

Extended European Search Report for Application No. 17154322.6-1762/3203116 dated Jul. 19, 2017; Date of Search Received Jul. 28, 2017; 8 pages.

* cited by examiner

*Primary Examiner* — Phutthiwat Wongwian
*Assistant Examiner* — Loren C Edwards
(74) *Attorney, Agent, or Firm* — Cantor Colburn LLP

(57) ABSTRACT

A thrust vector control actuator is provided including a ram, a first plate housed within the ram, a second plate housed within the ram, and a dividing wall housed within the ram. The dividing wall being located between the first plate and the second plate. The dividing wall defines a first chamber within the ram comprising the first plate and a second chamber within the ram comprising the second plate. The actuator also includes an output rod housed within the ram. The output rod having a first end and a second end. The second end is configured to operably connect to an output link. The actuator also includes a load relieving mechanism located within the ram. The load relieving mechanism configured to operatively connect the ram and the output rod. The load relieving mechanism is configured to absorb at least one transient load on the output rod.

21 Claims, 6 Drawing Sheets

LOAD RELIEVING MECHANISM FOR ELECTRO-MECHANICAL ACTUATOR

BACKGROUND

The subject matter disclosed herein generally relates to a thrust vector actuator for directing the thrust of a rocket engine and absorbing rocket engine transient loads.

Rockets may be used to launch payloads into space, including inserting payloads into various orbits around the earth or other celestial bodies and/or directing payloads through space. Rockets are maneuvered by vectoring a rocket engine thrust direction. In some configurations, a thrust vector control system may be configured to use hydraulic rams to displace an engine nozzle angle relative to a rocket core axis to control a thrust vector to ensure proper propulsion of the rocket. Hydraulic rams require high pressure hydraulic fluid pumping systems capable of providing, for example, up to 4000 psia at flow rates of 40-100 gallons per minute or greater.

In some systems, during a rocket engine's start cycle, a large transient force can be applied to the thrust vector control actuators. This transient force may be several times larger than the normal maximum force applied to the actuator during normal operation. Hydraulic actuators are traditionally used in rockets because they incorporate hydraulic high pressure relief valves, which allow the actuator to momentarily drift, relieving the load, during the high load, short duration transient events. Electro-mechanical actuators have been used in rockets because of their increased efficiency and reduction in the risk of leaks and fires. However electro-mechanical actuators do not have the same pressure relief capability of hydraulic actuators to absorb the escalated transient forces seen on engine start up. As such, electro-mechanical actuators must be designed robustly to be able to handle the escalated transient forces seen on engine start up. A more robust design often means larger and heavier components for the electro-mechanical actuator.

Such methods and systems have generally been considered satisfactory for their intended purposes. However, improved systems and particularly improved electro-mechanical thrust vector actuators may provide cost, efficiency, weight, and/or other benefits.

SUMMARY

According to one embodiment, a thrust vector control actuator is provided. The actuator includes a ram, a first plate housed within the ram, a second plate housed within the ram, and a dividing wall housed within the ram. The dividing wall being located between the first plate and the second plate. The dividing wall defines a first chamber within the ram comprising the first plate and a second chamber within the ram comprising the second plate. The actuator also includes an output rod housed within the ram. The output rod having a first end and a second end. The second end is configured to operably connect to an output link. The actuator also includes a load relieving mechanism located within the ram. The load relieving mechanism configured to operatively connect the ram and the output rod. The load relieving mechanism is configured to absorb at least one transient load on the output rod.

In addition to one or more of the features described above, or as an alternative, further embodiments of the thrust vector control actuator may include a housing configured to house the ram and the output rod.

In addition to one or more of the features described above, or as an alternative, further embodiments of the thrust vector control actuator may include that the load relieving mechanism further includes a first load relieving element located between the first plate and the dividing wall, and a second load relieving element located between the second plate and the dividing wall.

In addition to one or more of the features described above, or as an alternative, further embodiments of the thrust vector control actuator may include a damping fluid located within the second chamber, wherein the second plate has at least one aperture configured to permit the damping fluid to flow through the at least one aperture.

In addition to one or more of the features described above, or as an alternative, further embodiments of the thrust vector control actuator may include that the second plate is rigidly connected to the output rod.

In addition to one or more of the features described above, or as an alternative, further embodiments of the thrust vector control actuator may include that the dividing wall is rigidly connected to the ram.

In addition to one or more of the features described above, or as an alternative, further embodiments of the thrust vector control actuator may include a drive motor assembly operably connected to the ram.

According to one embodiment, a method of manufacturing a thrust vector control actuator is provided. The method includes installing a ram into a housing, installing a first plate into the ram, installing a second plate into the ram, and installing a dividing wall into the ram. The dividing wall being located between the first plate and the second plate. The dividing wall defines a first chamber within the ram comprising the first plate and a second chamber within the ram comprising the second plate. The method also includes installing an output rod into the ram. The output rod having a first end and a second end. The second end is configured to operably connect to an output link. The method also includes installing a load relieving mechanism into the ram. The load relieving mechanism configured to operatively connect the ram and the output rod. The load relieving mechanism is configured to absorb at least one transient load on the output rod.

In addition to one or more of the features described above, or as an alternative, further embodiments of the method may include that the load relieving mechanism further includes a first load relieving element located between the first plate and the dividing wall, and a second load relieving element located between the second plate and the dividing wall.

In addition to one or more of the features described above, or as an alternative, further embodiments of the method may include filling the second chamber with a damping fluid, wherein the second plate has at least one aperture configured to permit the damping fluid to flow through the at least one aperture.

In addition to one or more of the features described above, or as an alternative, further embodiments of the method may include that the second plate is rigidly connected to the output rod.

In addition to one or more of the features described above, or as an alternative, further embodiments of the method may include that the dividing wall is rigidly connected to the ram.

In addition to one or more of the features described above, or as an alternative, further embodiments of the method may include operably connecting a drive motor assembly to the ram.

According to another embodiment, a method of operating a thrust vector control actuator is provided. The method includes absorbing at least one transient load on an output rod using a load relieving mechanism. The output rod being operably connected to a ram via the load relieving mechanism. The load relieving mechanism includes a first load relieving element configured to absorb a transient tensile load and a second load relieving element configured to absorb a transient compression load.

In addition to one or more of the features described above, or as an alternative, further embodiments of the method may include damping the movement of the output rod with a damping fluid.

In addition to one or more of the features described above, or as an alternative, further embodiments of the method may include actuating the output rod with the ram.

In addition to one or more of the features described above, or as an alternative, further embodiments of the method may include driving the ram with a drive motor assembly.

Technical effects of embodiments of the present disclosure include a electromechanical thrust vector control actuator having a load relieving mechanism to withstand short, transient forces while minimizing the size and/or weight of the electromechanical thrust vector control actuator. Further technical effects include incorporating a first load relieving element and a second load relieving element in an electromechanical thrust vector control actuator.

The foregoing features and elements may be combined in various combinations without exclusivity, unless expressly indicated otherwise. These features and elements as well as the operation thereof will become more apparent in light of the following description and the accompanying drawings. It should be understood, however, that the following description and drawings are intended to be illustrative and explanatory in nature and non-limiting.

BRIEF DESCRIPTION OF THE DRAWINGS

The subject matter is particularly pointed out and distinctly claimed at the conclusion of the specification. The foregoing and other features, and advantages of the present disclosure are apparent from the following detailed description taken in conjunction with the accompanying drawings in which:

The detailed description explains embodiments of the present disclosure, together with advantages and features, by way of example with reference to the drawings.

DETAILED DESCRIPTION

Figure 1:
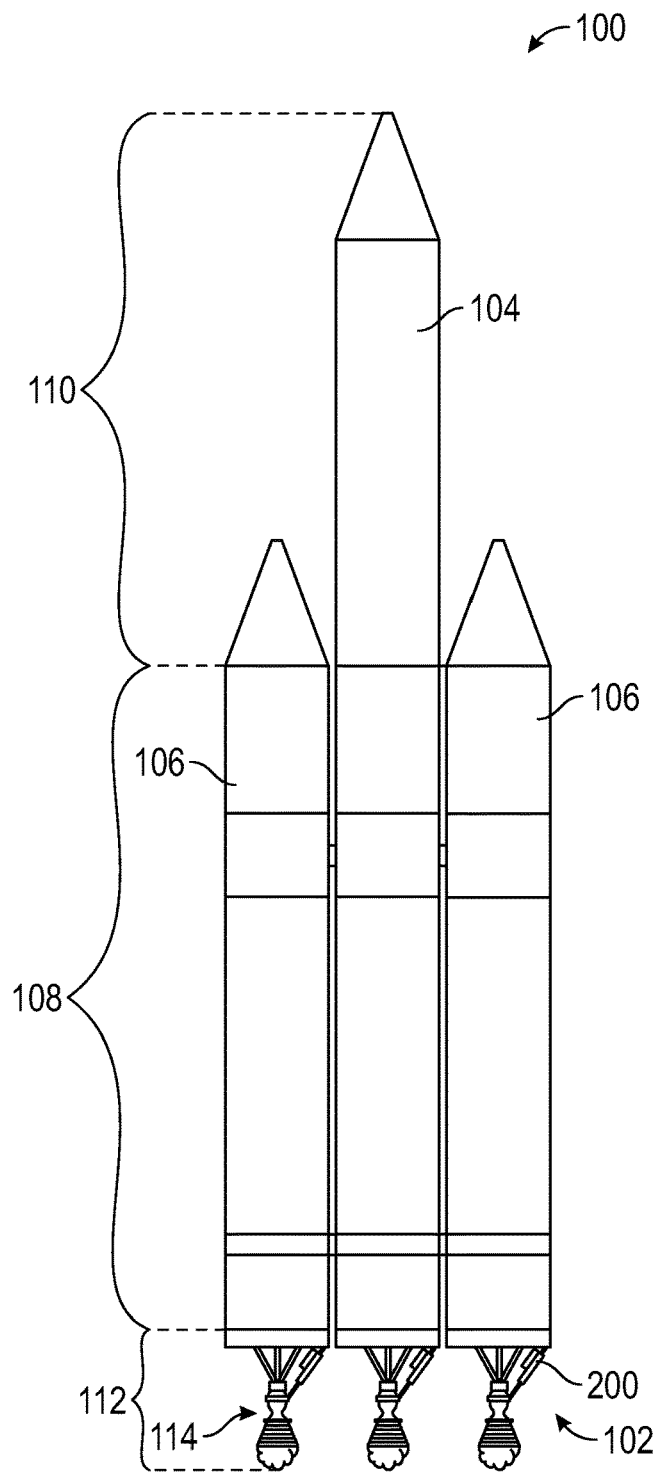
FIG. 1 is a schematic illustration of a craft that may incorporate embodiments of the present disclosure.
Figure 2:
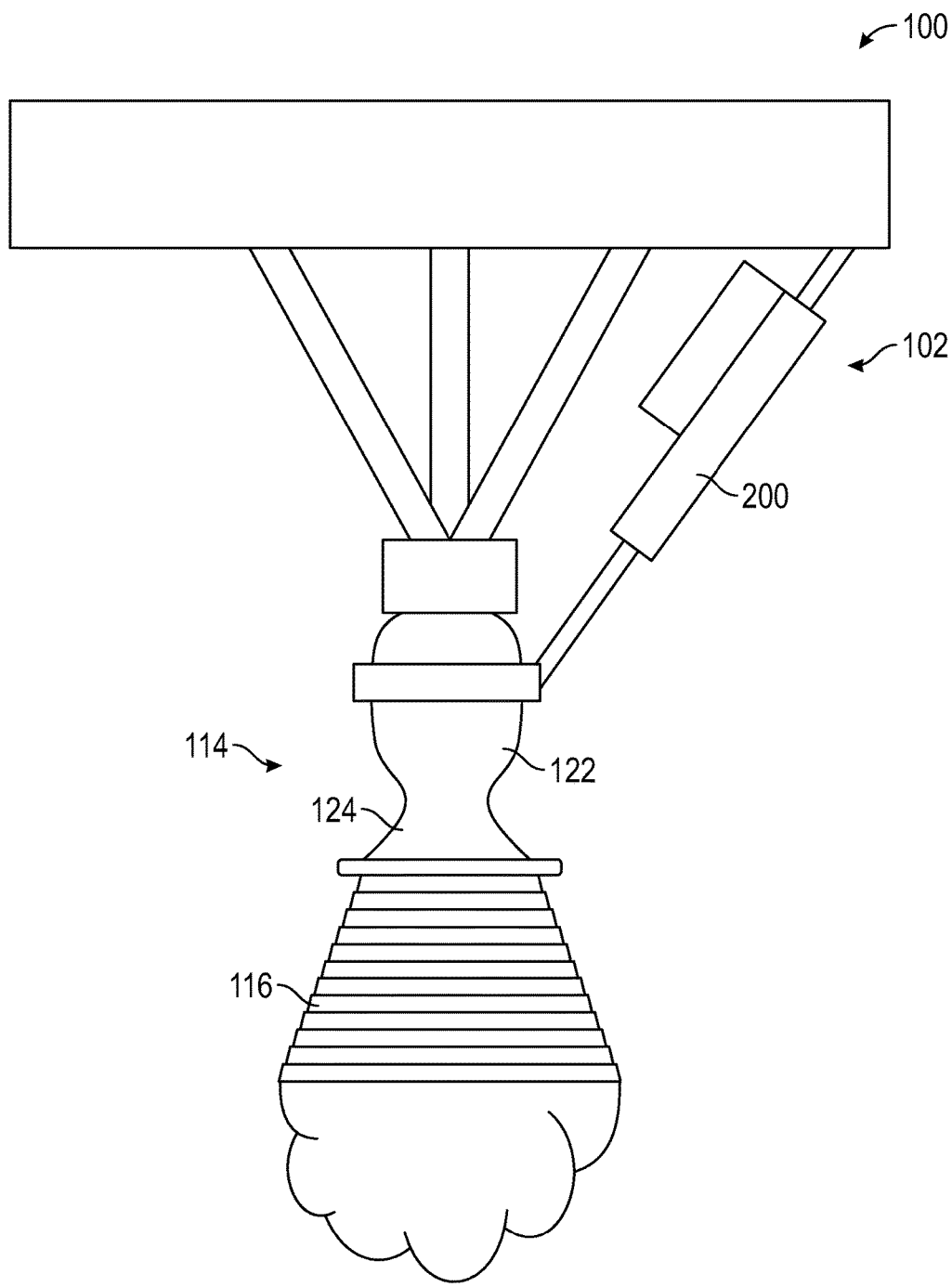
FIG. 2 is a schematic illustration of the propulsion system of the craft of FIG. 1, according to an embodiment of the present disclosure.

FIGS. 1 and 2 show schematic illustrations of a craft 100 that may be configured to employ embodiments provided herein. FIG. 1 shows a schematic illustration of the craft 100, which may be a rocket or other space craft. The craft 100 may include a core booster 104 and may also have additional boosters 106. Each booster 104, 106 includes a body portion 108 extending from a nose portion 110 to a tail portion 112. The tail portion includes a propulsion system 102. The propulsion system 102 includes an engine 114 of the respective booster 104, 106, and a thrust vector actuator 200. The body portions 108 may contain a liquid or solid propellant to fuel the respective engine 114. The body portion 108 may also be segmented into multiple booster stages, wherein each stage may contain its own propulsion system. The nose portion 110 may contain, but is not limited to, avionics, payload, and crew compartment, etc. depending on the mission and/or configuration of the craft 100.

Referring now to FIG. 2, an enlarged schematic illustration of the propulsion system 102 of the craft 100, according to an embodiment of the present disclosure is shown. As shown, the craft 100 may have a propulsion system 102 that may be configured as one or more engines 114, as shown, configured as a rocket engine. The engine 114 may be configured with a nozzle 116 that is configured to direct an output of the engine 114. The nozzle 116 thus enables directional control of the thrust of the engine 114 and thus the craft 100. Therefore, depending on the angle of tilt of the nozzle 116, the craft 100 may be propelled in a specific direction. The nozzle 116 alone may tilt or the entire engine 114 may tilt. As such, control of the engine 114 and/or nozzle 116 may be paramount to directional control and safety.

The engine 114 may include a combustion chamber 122 and a throat 124 with the nozzle 116 configured thereon to direct exhaust from the throat 124. Fuel from a respective booster (e.g., boosters 104, 106) is fed into the combustion chamber 122 and ignited. As will be appreciated by those of skill in the art, the combustion chamber may be larger or smaller depending on numerous variables, such as, for example fuel type. For instance, for a solid fuel rocket booster a portion of the booster body (e.g., body portion 108) or the entire booster body may serve as the combustion chamber. A controlled explosion in the combustion chamber 122 accelerates as it passes through the throat 124 and out the nozzle 116. This controlled explosion creates the thrust required to propel the craft 100. In order to maneuver the craft 100, the thrust may be directed by a thrust vector control actuator 200, which physically moves, tilts, translates, rotates, directs and/or adjusts the direction or angle of the engine 114 and/or the nozzle 116 to direct the thrust and thus the direction of movement of the craft 100. As will be appreciated by those of skill in the art, there may be two or more thrust vector control actuators 200 included on the craft 100, with multiple thrust vector control actuators 200 configured for each engine and/or nozzle. For example, in some embodiments, two thrust vector control actuators 200 may be positioned about ninety degrees apart to provide pitch and yaw capability to the craft 100. Accordingly, the thrust vector control actuators 200 may be provided in operational connection with the engine 114 and/or the nozzle 116. In some configurations, the thrust vector control actuators may incorporate hydraulic actuators and in other configurations the thrust vector control actuators may incorporate electro-mechanical actuators.

In some configurations, a thrust vector control system may be configured to use hydraulic rams as thrust vector actuators to displace an engine nozzle angle relative to a rocket core axis to control a thrust vector to ensure proper propulsion of the craft. Hydraulic rams require high pressure hydraulic fluid pumping systems capable of providing, for example, up to 4000 psia at flow rates of 40-100 gallons per minute or greater.

Electro-mechanical actuation systems may provide increased efficiency as compared to hydraulic actuators and provide additional safety benefits. For example, electro-mechanical actuators eliminate the fire hazards and leakage potentials associated with the hydraulic fluids used in hydraulic actuation systems.

As provided herein, in accordance with some embodiments of the present disclosure, electro-mechanical actuators for thrust vector control actuators are disclosed. In some embodiments, a load relieving mechanism is incorporated on an output rod of the thrust vector control actuator. The load relieving mechanism allows the thrust vector control actuator to relieve transient loads seen on the output rod.

Figure 3:
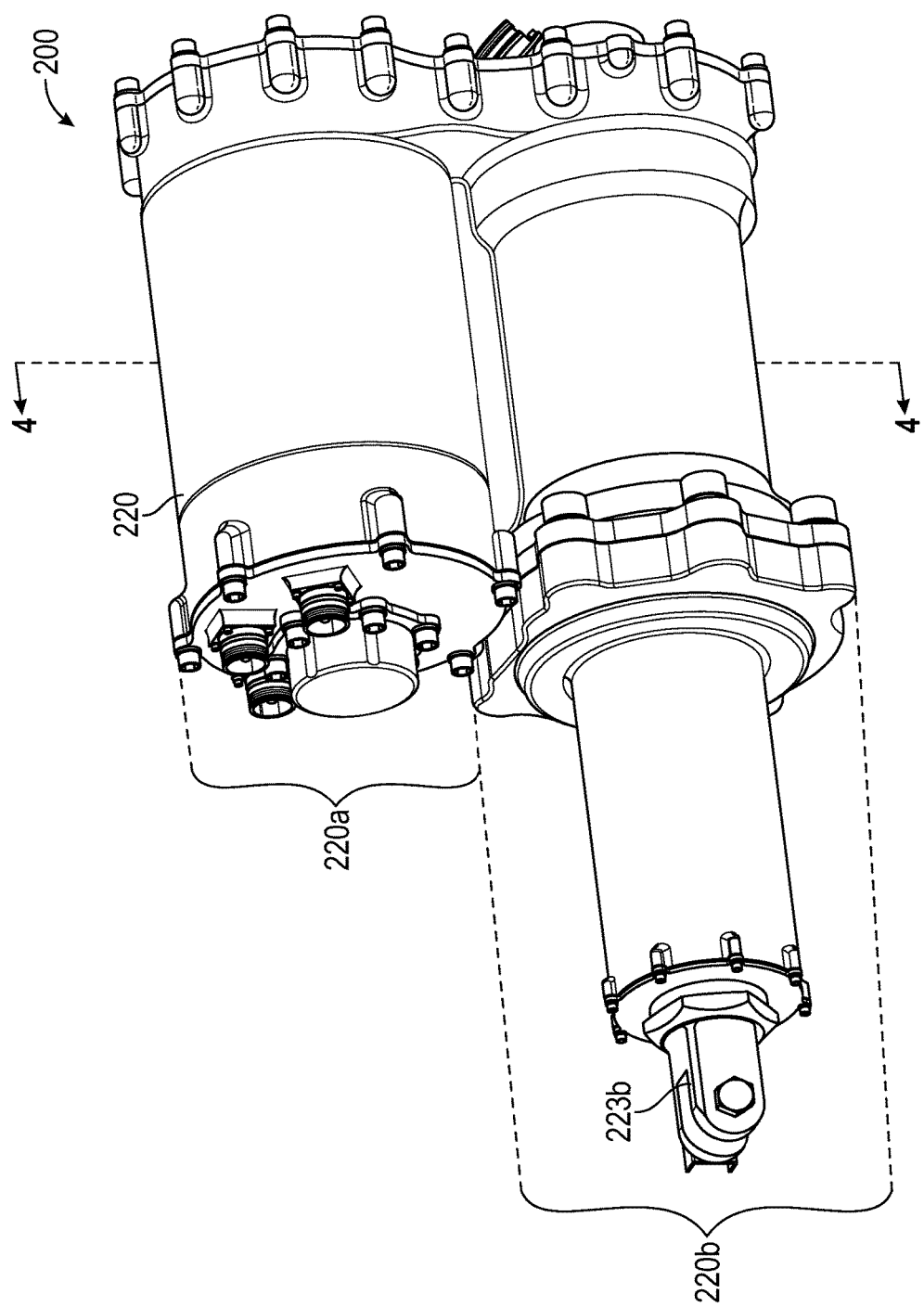
FIG. 3 is an isometric schematic illustration of a thrust vector actuator, according to an embodiment of the present disclosure.
Figure 4:
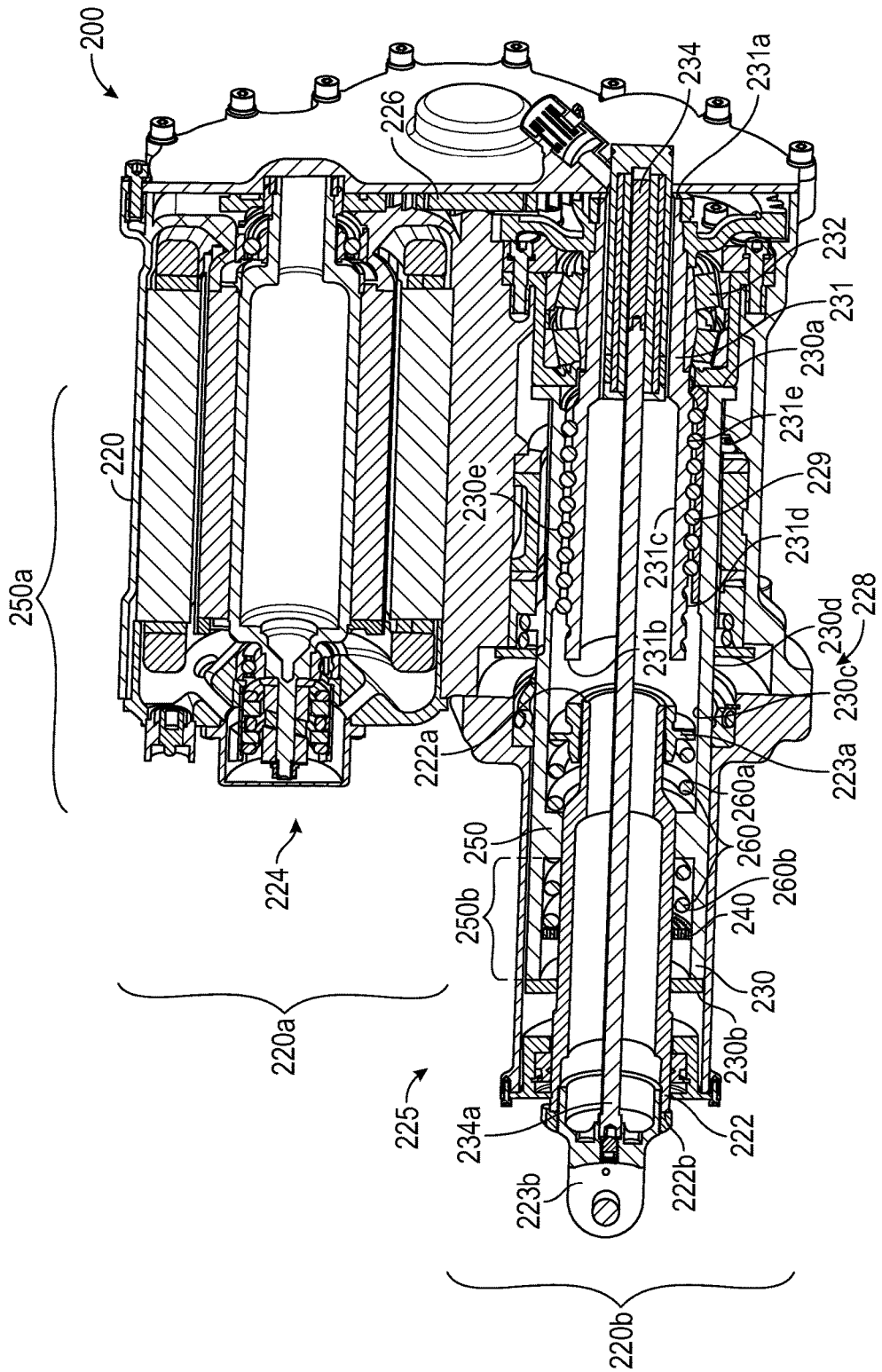
FIG. 4 is a isometric cross-sectional schematic illustration illustrating the components of the thrust vector actuator of FIG. 3, according to an embodiment of the present disclosure.
Figure 5:
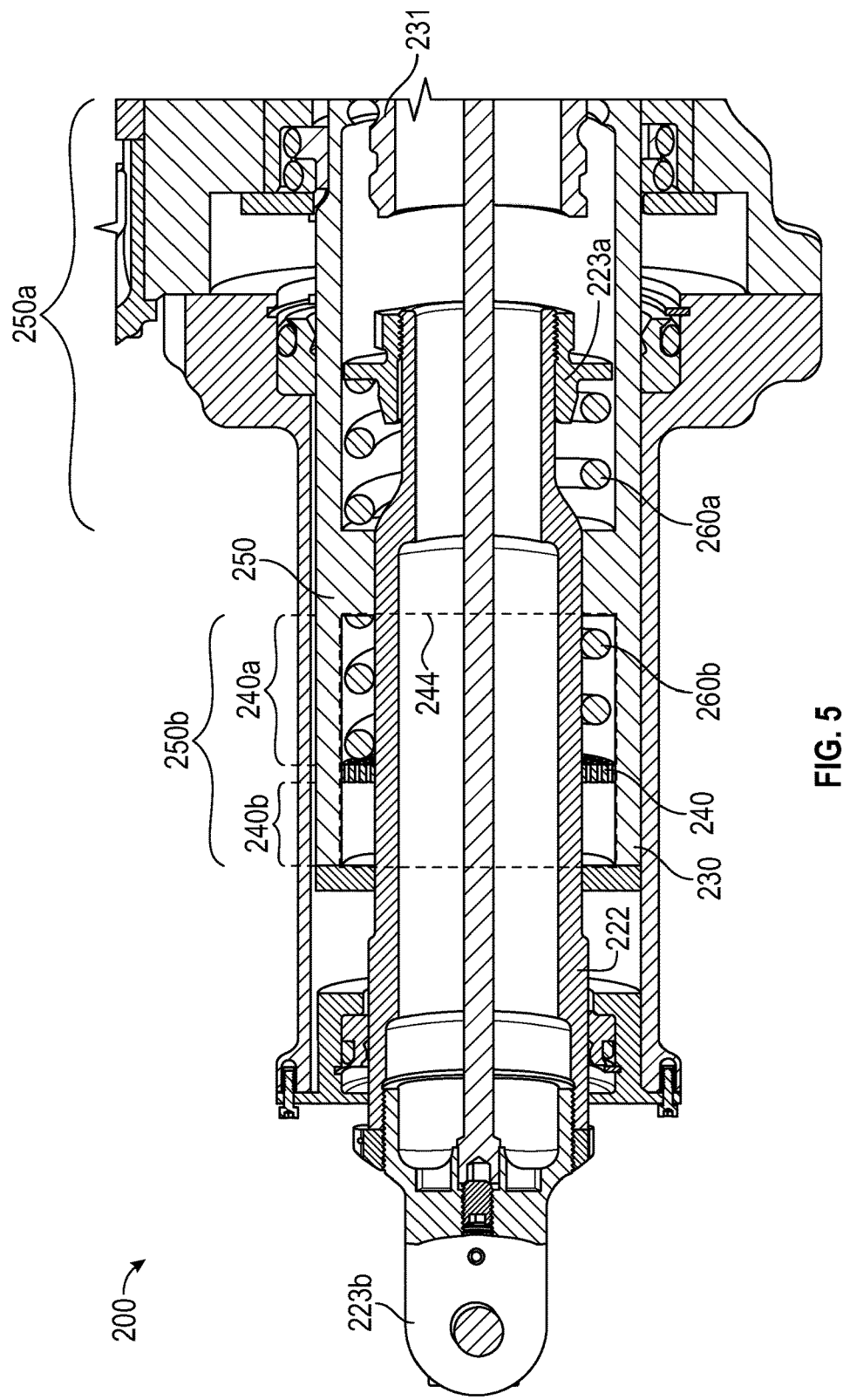
FIG. 5 is an enlarged schematic illustration of a portion of the cross-sectional schematic illustration shown in FIG. 4, according to an embodiment of the present disclosure.
Figure 6:
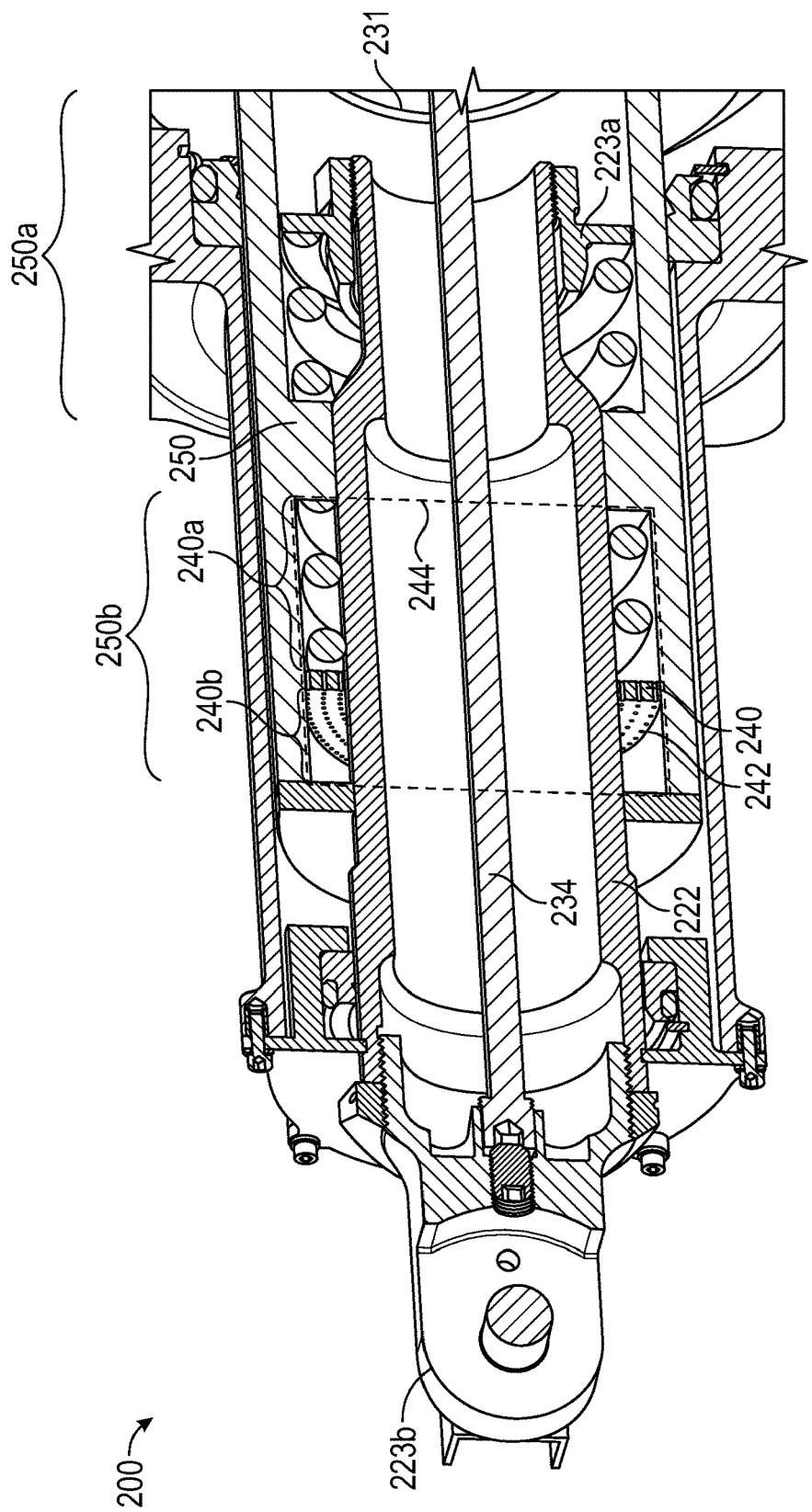
FIG. 6 is an enlarged isometric illustration of a portion of the cross-sectional schematic illustration shown in FIG. 4, according to an embodiment of the present disclosure.

Turning now to FIGS. 3-6, various schematic illustrations of a thrust vector control actuator 200 in accordance with a non-limiting embodiment of the present disclosure are shown. FIG. 3 shows an isometric illustration of the thrust vector control actuator 200 that may be configured to control a thrust vector of an engine or nozzle of a rocket propulsion system (e.g., as shown and described with respect to FIGS. 1 and 2). FIG. 4 is a isometric cross-sectional schematic illustration illustrating the components of the thrust vector control actuator 200 of FIG. 3. FIG. 5 is an enlarged schematic illustration of a portion of the cross-sectional schematic illustration shown in FIG. 4, according to an embodiment of the present disclosure. FIG. 6 is an enlarged isometric illustration of a portion of the cross-sectional schematic illustration shown in FIG. 4, according to an embodiment of the present disclosure.

Turning specifically to FIGS. 3 and 4. The thrust vector control actuator 200 includes a housing 220 configured to house a drive motor assembly 224 and an actuator 225. As such, the housing 220 may include or define a housing first section 220a configured to house the drive motor assembly 224 and a housing second section 220b configured to house the actuator 225 with an associated output rod 222. The output rod 222 may be operably connected to an output link 223b that may be operably connected to an engine and/or nozzle of a propulsion system (e.g., propulsion system 102 shown in FIGS. 1 and 2).

Turning now specifically to FIG. 4, a cross-sectional schematic illustration of the thrust vector control actuator 200 is shown as viewed along the line 4-4 of FIG. 3. A brief overview of the vector control actuator 200 is provided in the present paragraph, as follows. As shown in the illustrated embodiment, the thrust vector control actuator 200 includes a ram 230, a first plate 223a housed within the ram 230, and a second plate 240 housed within the ram 230. The thrust vector control actuator 200 further includes a dividing wall 250 housed within the ram 230. The dividing wall 250 being located between the first plate 223a and the second plate 240. The dividing wall 250 defines a first chamber 250a within the ram 230 comprising the first plate 223a and a second chamber 250b within the ram 230 comprising the second plate 240. Also, included in the thrust vector control actuator 200 is an output rod 222 housed within the ram 230. The output rod 222 having a first end 222a and a second end 222b. The second end 222b is configured to operably connect to an output link 223b. Further included in the thrust vector control actuator 200 is a load relieving mechanism 260 located within the ram 230, the load relieving mechanism 260 configured to operatively connect the ram 230 and the output rod 222. The load relieving mechanism 260 is configured to absorb at least one transient load on the output rod 222.

As further shown, the housing first section 220a of the housing 220 encloses a drive motor assembly 224. The drive motor assembly 224 may be configured in various manners including, but not limited to, direct drive motors, servomotors, electromagnetic motors, transverse flux motors, electric motors, parallel flux motors, brushed permanent magnet motor, brushless permanent magnet motor, wound field motor, induction motor, switched reluctance motor, etc.

The drive motor assembly 224 may be operably connected to the actuator 225 that may support movement of the output link 223b by a gear reduction system 226. The gear reduction system 226 may drive or rotate a ball screw assembly 228. The ball screw assembly 228 may include a screw 231, and a plurality of ball bearings 229. In the illustrated embodiment, the ball screw 228 assembly is used to drive the ram 230 but other methods may be used to drive the ram 230. Also, as shown in the illustrated embodiment, the screw 231 and the ram 230 may be tubular in shape. The screw 231 may have a first end 231a, a second end 231b, an inner surface 231c, and an outer surface 231d, wherein the outer surface 231d includes a threaded portion 231e at the second end 231b. In some embodiments, the screw 231 may be operably connected at the first end 231a to the drive motor assembly 224. For example, this operable connection between the screw 231 and the drive motor assembly 224 may be through the gear reduction system 226, as shown in FIG. 4. In alternative embodiments (not shown), this operable connection between the screw 231 and the drive motor assembly 224 may be a connection such as, for example, a direct connection, a belt connection, a chain connection, a friction wheel connection or other connection arrangement to operably drive the screw 231 using the drive motor assembly 224.

The ram 230 may have a first end 230a, a second end 230b, an inner surface 230c, and an outer surface 230d, wherein the inner surface 230c of the ram 230 includes a threaded portion 230e at the first end 230a of the ram 230. The threaded portion 230e of the inner surface 230c of the ram 230 is operably connected to the threaded portion 231e of the outer surface 231d of the screw 231 via a plurality of ball bearings 229. As shown, a thrust bearing 232 may be positioned about a portion of the ball screw assembly 228 at the first end of the screw 231a.

As in the illustrated embodiment, the screw 231 may be driven or rotated by rotation of the gear reduction system 226, which is driven by the drive motor assembly 224. As the screw 231 rotates, the ram 230 may be moved or driven within the housing 220. The screw 231 may drive the ram 230 through a threaded connection wherein bearings 229 are located within the threaded portion 231e of the screw 231 and the threaded portion 230e of the ram 230.

The thrust vector control actuator 200 further includes an output rod 222 having a first end 222a and a second end 222b. The second end 222b is configured to operably connect to an output link 223b. As shown in the illustrated embodiment, the first plate 223a may be fixedly or rigidly connected to the output rod 222 at the first end 222a. As shown in the illustrated embodiment, the second plate 240 may be fixedly or rigidly connected to the output rod 222. In alternative embodiments, the first plate 223a and the second plate 240 may be fixedly or rigidly connected to the ram 230, while the dividing wall 250 is fixedly or rigidly connected to the output rod 222. The output rod 222 is operably connected to the ball screw assembly 228 via a load relieving mechanism 260. The output rod 222 may be in contact with and movable relative to and/or with the ram 230, depending on a transient load on the output link 223b. Thus, operation of the drive motor assembly 224 may enable control and movement of the output rod 222 through the ball screw assembly 228.

Further, as shown, the thrust vector control actuator 200 may have a position sensor 234 configured to detect the position of the output link 223b. As shown, the output sensor 234 may be located at the first end 231a of the screw 231 and connected to the output link 223b via a linkage 234a. In some non-limiting embodiments, the position sensor 234 may be a linear variable differential transformer.

The screw 231 may rotate within the housing second section 220b of the housing 220 to drive the ram 230. The ram 230, as mentioned above, is operably connected to the output rod 222 via a load relieving mechanism 260. As the ram 230 translates, the load relieving mechanism 260 causes the output rod 222 to translate as well. The load relieving mechanism 260 is configured to absorb at least one transient load on the output rod 222. The transient load may be at least one of a compression load or a tension load. As shown, the ram 230 further includes a dividing wall 250 separating the inside of the ram 230 into a first chamber 250a proximate to the first end 230a of the ram 230 and a second chamber 250b proximate to the second end 230b of the ram 230. In the illustrated embodiment, the dividing wall 250 is fixedly or rigidly connected to the ram 230. The output rod 222 is located within the ram 230. The first plate 223a is located within the first chamber 250a and the output link 223b is located outside the ram 230. As shown, the load relieving mechanism 260 may be located within the ram 230. The load relieving mechanism 260 may be composed of two or more components. In the illustrated embodiment, the load relieving mechanism 260 is composed of a first load relieving element 260a and a second load relieving element 260b. The first load relieving element 260a may be located within the first chamber 250a of the ram 230 between the dividing wall 250 and the first plate 223a. The second load relieving element 260b may be located within the second chamber 250b and the second plate 240. Further, as in the illustrated embodiment, the first load relieving element 260a and the second load relieving element 260b may be springs.

If a large transient compressive load spike hits the output link 223b, the output rod 222 will be momentarily compressed into the housing second section 220b by a small amount, without overloading the ball screw assembly 228, thrust bearings 232, gears 226, and/or housing 220. This transient motion will be accommodated by the compression of the second load relieving element 260b. After the transient load has passed, the second load relieving element 260b will push the output rod 222 back to its original position. Similarly, if a large transient tensile load spike hits the output link 223b, the output rod 222 will be momentarily pulled out of the housing second section 220b by a small amount, without overloading the ball screw assembly 228, thrust bearings 232, gears 226, and/or housing 220. This transient motion will be accommodated by the compression of the first load relieving element 260a. After the transient load has passed, the first load relieving element 260a will push the output rod 222 back to its original position.

Referring now to FIGS. 5 and 6. The ram 230 may further include a damping fluid (not shown) located in the second chamber 250b. As seen in the illustrated embodiment the second plate 240 separates the second chamber 250b into a first damping fluid chamber 240a and a second damping fluid chamber 240b. In the illustrated embodiment, the second plate 240 has at least one aperture 242 configured to permit the damping fluid to flow through the at least one aperture 242. The damping fluid, second plate 240, the first damping fluid chamber 240a, and the second damping fluid chamber 240b all function together to form a damping system 244 of the thrust vector control actuator 200.

The damping system 244 helps prevent unwanted oscillations on the output link 223b during the transient tensile and transient compression load spikes, and also during normal operation. The at least one apertures 242 in the second plate 240 allow a specific amount of damping fluid to move from first damping fluid chamber 240a to the second damping fluid chamber 240b in response to relative motion between the ram 230 and the output rod 222. The apertures 242 are sized to provide a resistance to the fluid movement from first damping fluid chamber 240a to the second damping fluid chamber 240b. This resistance absorbs energy, thereby providing a damping force to resist unwanted relative motion between the ram 230 and the output rod 222.

While the present disclosure has been described in detail in connection with only a limited number of embodiments, it should be readily understood that the present disclosure is not limited to such disclosed embodiments. Rather, the present disclosure can be modified to incorporate any number of variations, alterations, substitutions, combinations, sub-combinations, or equivalent arrangements not heretofore described, but which are commensurate with the scope of the present disclosure. Additionally, while various embodiments of the present disclosure have been described, it is to be understood that aspects of the present disclosure may include only some of the described embodiments.

For example, although the load relieving mechanism are shown and described as spring, those of skill in the art will appreciate that other types of load relieving mechanisms may be employed without departing from the scope of the present disclosure. Further, one specific configuration of the components of a thrust vector control actuator, is shown and described. However, those of skill in the art will appreciate that the components and features may be arranged in other configurations without departing from the scope of the present disclosure.

Accordingly, the present disclosure is not to be seen as limited by the foregoing description, but is only limited by the scope of the appended claims.

What is claimed is:

1. A thrust vector control actuator comprising:
   a drive motor assembly, the drive motor assembly comprising an electric motor;
   a ball screw assembly operably connected to the drive motor assembly;
   a housing;
   a ram located within the housing, the ram being operably connected to the ball screw assembly and configured to linearly translate relative to the housing when the drive motor assembly is activated;
   a first plate housed within the ram;
   a second plate housed within the ram;
   a dividing wall housed within the ram, the dividing wall being located between the first plate and the second plate, wherein the dividing wall defines a first chamber within the ram comprising the first plate and a second chamber within the ram comprising the second plate, wherein the second plate separates the second chamber into a first damping fluid chamber and a second damping fluid chamber;

an output rod housed within the ram, the output rod having a first end and a second end, wherein the second end is configured to operably connect to an output link;

a load relieving mechanism located within the ram, the load relieving mechanism configured to operatively connect the ram and the output rod such that the output rod linearly translates when the ram linearly translates, wherein the load relieving mechanism is configured to absorb at least one transient load on the output rod; and a damping fluid located within the second chamber, wherein the second plate has at least one aperture configured to permit the damping fluid to flow through the at least one aperture between the first damping fluid chamber and the second damping fluid chamber.

2. The thrust vector control actuator of claim 1, wherein the load relieving mechanism further comprises:

a first load relieving element located between the first plate and the dividing wall; and a second load relieving element located between the second plate and the dividing wall.

3. The thrust vector control actuator of claim 2, wherein the first load relieving element and the second load relieving elements are springs.

4. The thrust vector control actuator of claim 1, wherein: the second plate is rigidly connected to the output rod.

5. The thrust vector control actuator of claim 1, wherein: the dividing wall is rigidly connected to the ram.

6. A method of operating the thrust vector control actuator of claim 1, the method comprising:

absorbing the at least one transient load on the output rod using the load relieving mechanism, the output rod being operably connected to the ram via the load relieving mechanism, wherein the load relieving mechanism includes a first load relieving element configured to absorb a transient tensile load and a second load relieving element configured to absorb a transient compression load.

7. The method of claim 6, further comprising:

damping the movement of the output rod with the damping fluid.

8. The method of claim 6, further comprising:

actuating the output rod with the ram.

9. The method of claim 6, further comprising:

driving the ram with the drive motor assembly.

10. The thrust vector control actuator of claim 1, wherein the ram is fully enclosed within the housing.

11. The thrust vector control actuator of claim 10, wherein the ram is configured to linearly translate relative to the housing while remaining fully enclosed within the housing when the drive motor assembly is activated.

12. The thrust vector control actuator of claim 1, wherein the first plate is fully enclosed within the housing.

13. The thrust vector control actuator of claim 1, wherein the ball screw assembly is configured to rotate when the drive motor assembly is activated.

14. The thrust vector control actuator of claim 13, wherein the ram is configured to linearly translate when the ball screw assembly is rotated.

15. The thrust vector control actuator of claim 1, wherein the ball screw assembly further comprises:

a plurality of ball bearings; and a screw having an outer surface including a threaded portion, wherein the ram further comprises an inner surface including a threaded portion of the inner surface of the ram, and wherein the threaded portion of the inner surface of the ram is operably connected to the threaded portion of the outer surface of the screw via the plurality of ball bearings.

16. A method of manufacturing the thrust vector control actuator of claim 1 comprising:

installing the ram into the housing;

installing the first plate into the ram;

installing the second plate into the ram;

installing the dividing wall into the ram, the dividing wall being located between the first plate and the second plate, wherein the dividing wall defines the first chamber within the ram comprising the first plate and the second chamber within the ram comprising the second plate;

installing the output rod into the ram, the output rod having the first end and the second end, wherein the second end is configured to operably connect to the output link; and installing the load relieving mechanism into the ram, the load relieving mechanism configured to operatively connect the ram and the output rod, wherein the load relieving mechanism is configured to absorb the at least one transient load on the output rod.

17. The method of claim 16, wherein the load relieving mechanism further comprises: a first load relieving element located between the first plate and the dividing wall; and a second load relieving element located between the second plate and the dividing wall.

18. The method of claim 16, further comprising: filling the second chamber with the damping fluid, wherein the second plate has the at least one aperture configured to permit the damping fluid to flow through the at least one aperture.

19. The method of claim 16, wherein: the second plate is rigidly connected to the output rod.

20. The method of claim 16, wherein:

the dividing wall is rigidly connected to the ram.

21. The method of claim 16, further comprising: operably connecting the drive motor assembly to the ram.

* * * * *